(No Model.) 2 Sheets—Sheet 1.
W. S. SALISBURY.
MOTOR FOR STREET CARS.
No. 394,015. Patented Dec. 4, 1888.
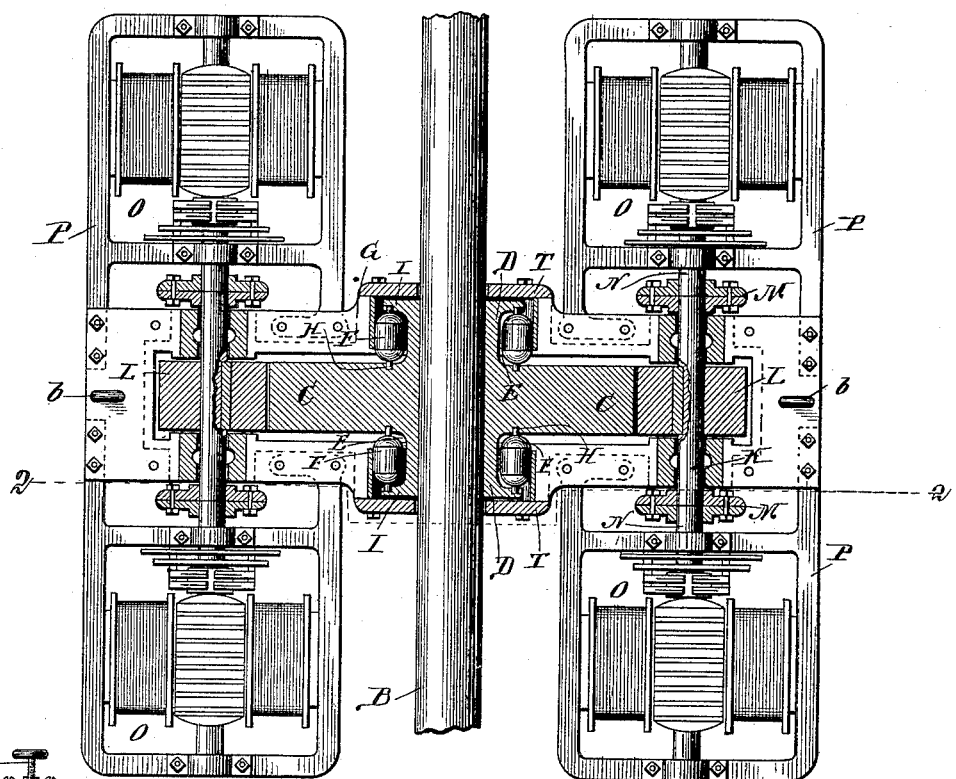
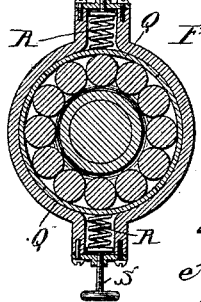
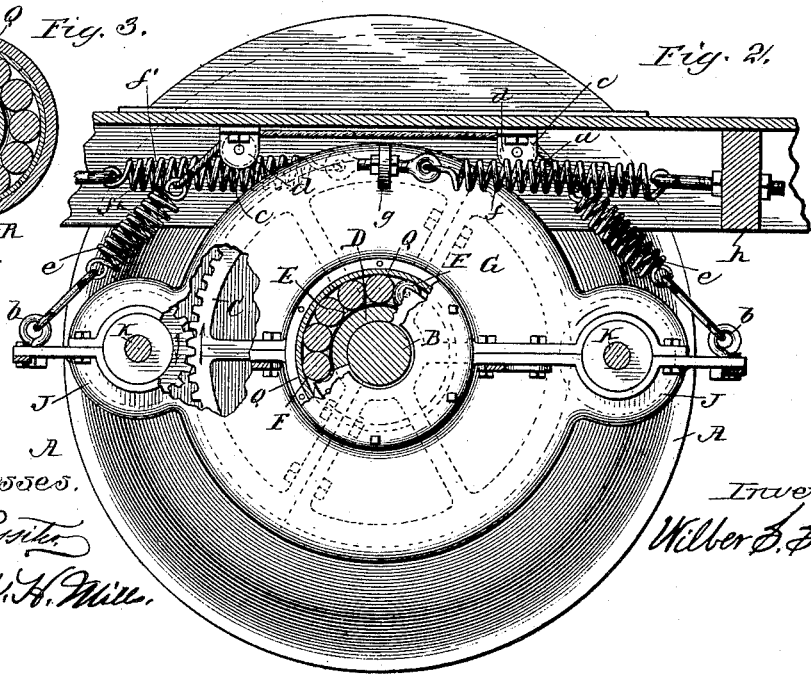
Witnesses.
W. Rossiter
Fredk. H. Mill.
Inventor.
Wilber S. Salisbury (No Model.) 2 Sheets—Sheet 2.

W. S. SALISBURY.
MOTOR FOR STREET CARS.

No. 394,015. Patented Dec. 4, 1888.

Witnesses
W. Rossiter
Fredk. H. Mills

Inventor
Wilber S. Salisbury

UNITED STATES PATENT OFFICE.

WILBER S. SALISBURY, OF CHICAGO, ILLINOIS.

MOTOR FOR STREET-CARS.

SPECIFICATION forming part of Letters Patent No. 394,015, dated December 4, 1888.

Application filed July 5, 1888. Serial No. 279,026. (No model.)

*To all whom it may concern:*

Be it known that I, WILBER S. SALISBURY, a citizen of the United States, residing at Chicago, in the county of Cook and State of Illinois, have invented certain new and useful Improvements in Motors for Street-Cars, of which the following is a specification.

This invention relates to improvements in motors for street-cars, or, rather, to the means of supporting, suspending, and gearing electric motors for operating the cars, and is especially designed as an improvement upon the invention set forth in Letters Patent of the United States No. 385,727, granted me on the 10th day of July, A. D. 1888, in which application was shown, but not claimed, a casing and gearing constructed in substantially the same manner as that herein shown and described.

The prime object of this invention is to have the motors supported and balanced upon the axle of a car in such manner that the motors may not only be suspended from but independent of and unaffected by the movements of the car-body, but may also be opposed in their oscillation about the axle by a yielding spring or other force, whereby in starting and stopping the action of the motors will simulate that of draft-animals, and the car be thus relieved of the disagreeable jerks and jars which would otherwise occur.

Another object is to protect the motors and the gearing connecting them with the axle from the lodgment thereon of dust and dirt, and to have the support of the motors antifrictionally journaled upon the axle, whereby the friction thereof is materially reduced and the devices for suspending the motors from the car-body correspondingly relieved of strain during the almost continuous oscillations of the said support and motors upon the axle.

A further object is to dispense with the necessity for turning down or truing the axles, in order to produce a true bearing for such anti-friction devices, by having the bearing for such devices directly upon the attached parts, whereby, when placed upon any axle, they will operate perfectly without the necessity for dressing, turning, or otherwise preparing the axle.

I attain these objects by the devices illustrated in the accompanying drawings, in which—

Figure 4:
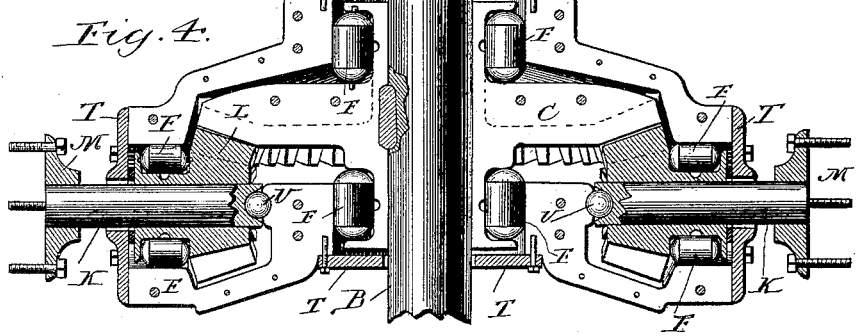
Figure 5:
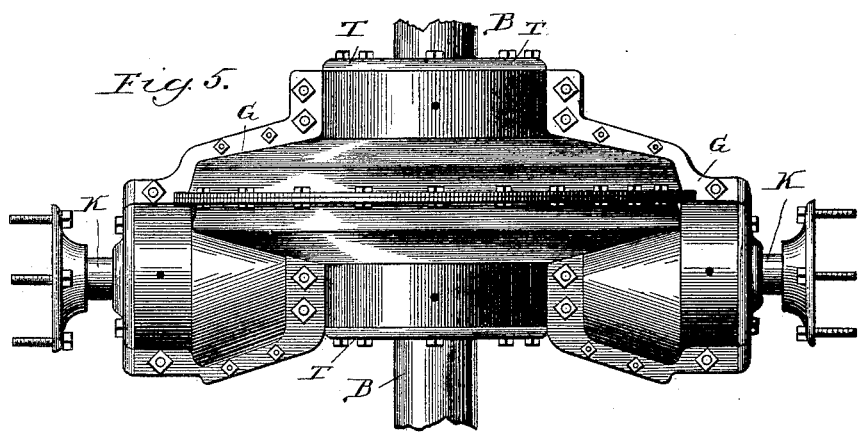
Figure 6:
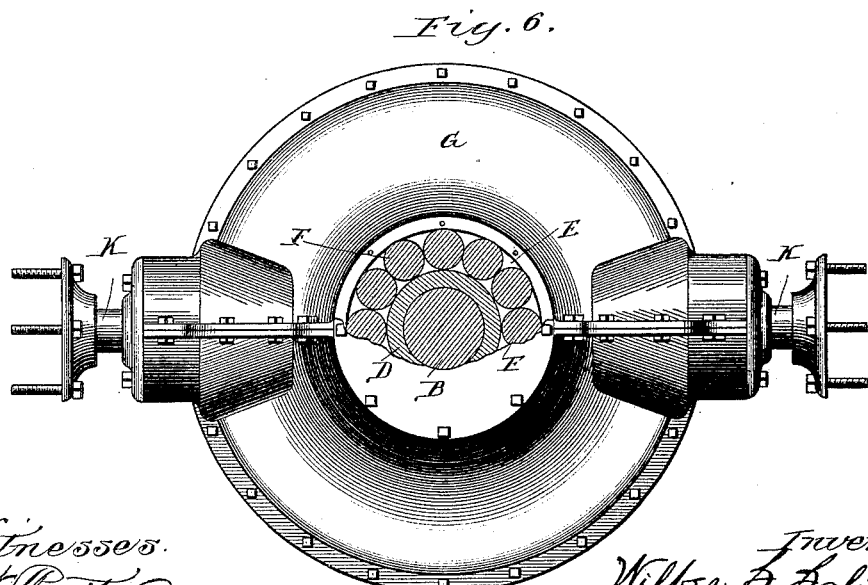

Figure 1 represents a plan view, partly in section, of a portion of a car-axle and devices applied thereto embodying my invention, illustrating the employment of rim cog-wheels between the axle and motors. Fig. 2 is a transverse section thereof on the line 2 2 of Fig. 1. Fig. 3 is a detail section showing means for taking up the wear upon the anti-friction devices. Fig. 4 is a detail plan view, partly in section, of one-half of a modified form of the gearing between the axle and motor, illustrating the employment of bevel-gears. Fig. 5 is a plan view of the entire device, more particularly showing the casing for containing the gearing; and Fig. 6 is a side elevation thereof, partly broken away, showing the axle in section.

Similar letters of reference indicate the same parts in the several figures of the drawings.

Referring by letter to the accompanying drawings, A indicates the car-wheel, and B the axle thereof, upon which is mounted and keyed thereto, about the center of length thereof, a cog-wheel, C, provided with elongated hubs D to each side thereof, in the outer peripheries of which are formed annular grooves E, constituting tracks or bearing-ways for short anti-friction cylinders F, fitting between said hubs and the bearing-walls of a casing, G, for covering the cog-wheel C and other operative parts of my device, as hereinafter described. I may here state, however, that instead of the anti-friction rollers bearing upon the hub they may be provided with short contracted journals H, having bearings in the body of the cog-wheel, and end flanges, I, upon the hubs, respectively formed by the grooves before mentioned, in which latter partly lie the said rollers, but do not otherwise bear upon the hub.

The casing G, before mentioned, as well as the cog-wheel C, is made in two sections and bolted together for convenience of attachment to the axle, which, as is well known, is rigidly secured to the wheels thereof, the casing preferably having a generally circular form in side elevation, and being provided with smaller circular extensions, J, at the front and rear thereof in a horizontal plane with the axle, in which are journaled short shafts K, upon which are mounted smaller cog-wheels, L, meshing with the larger cog-wheels, C, mounted upon the axle. With these shafts are also axially and detachably connected at each end, by means of flange-couplings M, the armature-shaft N of electric motors O, preferably one to each end of each shaft, the field-magnets of which are suitably mounted in skeleton frames P, rigidly secured to and projecting laterally from the casing G and extending parallel with the axle, which frames also furnish bearings for the outer ends of the said shafts. I have also found that the anti-friction bearings of the casing may be advantageously provided with removable bearing-surfaces, consisting of sectional bushings Q, interposed between the rollers F and the walls of the casing, the wear of which, or of the rollers, may be readily taken up by having opposing sections seated upon springs R, the tension of which is controlled by hand-screws S, working through removable caps attached to the casing and covering the recesses in which the springs are confined, as more clearly shown in Fig. 3. These removable sectional bushings, as shown in Fig. 1, may be of such a width that only one-half the surface thereof forms the bearings of the rollers, and being held in position by cap-plates T, which also furnish a means of access to the rollers, they may be taken out and reversed whenever one-half thereof is worn beyond usefulness.

While I prefer to employ rim cog-wheels, such as are shown in Figs. 1 and 2, for the transmission of power from the motors to the axle, my invention is equally well adapted for the employment of beveled gears for this purpose, as illustrated in Figs. 4, 5, and 6 in the drawings, in which case it is only necessary to alter the form of the casing, the construction and organization of the parts being identical with that of the preferred construction, with the one exception that I provide against end-thrusts, which might prove detrimental to the gearing and possibly occasion the riding or breaking of the teeth, by interposing between the ends of the short shafts K and the casing a ball-bearing, U, socketed partly in the end of the shaft and partly in the casing.

Such a bearing, while it does not in the least interfere with the rotation of the shafts, effectually prevents an end-thrust thereof and the consequent binding between the teeth of the gear-wheels.

By the employment of the sectional casing and gear-wheel with the anti-frictional bearing, as herein described, particular advantages are derived, not only from the protection of all the operative parts thereof from the lodgment thereon of dust and dirt, but also by doing away with the necessity for dressing or turning down the axle so as to form true bearing-surfaces for the anti-friction devices, for the bearing of such devices upon the hubs of the gear-wheels may be turned and made true in the shop and before being attached to the axle. Were this provision not made, however, the axle of the car, which there is now no necessity for making true, would have to be turned down so as to form a bearing for the rollers, thus necessitating their removal from the car, while my devices may be attached thereto without removing the axle and wheels, and hence at a greatly lessened expenditure of time and money.

It will be observed that the casing supporting the gearing and electric motors is exactly balanced upon the axle; but I prefer to yieldingly connect the same with the body of the car, so as to suspend it therefrom in such manner as not to be affected by the movements of the car-body independent of the axles, and which connection will normally maintain the casing in a horizontal position. To this end I have provided the flexible stay $a$, attached at its ends, respectively, to eyes $b$, secured at each side of the casing, and extending upwardly over the pulleys $c$, journaled in brackets $d$, attached to the under side of the car-body, between which pulleys and the eyes $b$ are interposed in and forming a part of said flexible stay coiled springs $e$, which give to this stay an elasticity permitting a vertical movement of the car-body without in the least affecting the position of the casing upon the axle, while the longitudinal tilting or teetering of the car-body is taken up by the running of the stay over the pulleys. Another important function of this yielding stay is the taking of the weight of the casing and its connections off of the axle, thereby materially reducing friction, and consequently the power required to operate the car.

This invention also has for one of its objects to avoid all jerks and unpleasant jars in the starting and stopping of the car by simulating as nearly as possible the yielding force of draft-animals, which may best be accomplished by opposing a spring or other yielding force to the initial movement or oscillation of the casing and motors about the axle, to which end I employ powerfully-coiled springs $f f'$, one to the front and one to the rear of the casing, secured at their ends, respectively, to lugs $g$ upon the casing, and to cross-timbers $h$ of the car superstructure, these springs lying in a horizontal plane and operating alternately, one in starting the car and the other in stopping it.

It will be observed that the casing, being loosely journaled upon the axle, is free to oscillate thereon, and hence, when in starting the car the gear-wheels turn in the direction indicated by the arrows in Fig. 2, the natural tendency of the casing will be to make a partial rotation toward the left, because, with the gear wheels upon the axle stationary and resisting, the small drive gear-wheel upon the left-hand armature-shaft would naturally climb down the large wheel, while the right-hand drive gear-wheel would climb up the large wheel; but in this movement the casing would be resisted by the strong spring $f$, which, while yielding slightly to the impulse sufficiently to relieve the car of a jerk or jar in starting, would at the same time exert its influence tending to cause the large gear-wheel to rotate in the right direction. In stopping, the other spring, $f'$, would of course operate in exactly the same manner, or both of these springs might be caused to operate in unison, one expanding and the other contracting simultaneously therewith; and in conclusion I may add that it will be no departure from my invention to have these springs connected and operating in any other manner, so long as they will subserve the intended purpose.

Having described my invention, what I claim, and desire to secure by Letters Patent, is—

1. In a motor for street-cars, the combination, with the axle and a gear-wheel mounted thereon, of a casing covering said wheel, electric motors mounted on said casing, a gear-connection between said motors and gear-wheels, and an anti-friction bearing for said casing upon the axle, substantially as described.

2. In a motor for street-cars, the combination, with the axle and a gear-wheel mounted thereon, of a casing covering said wheel, frames projecting therefrom, electric motors the field-magnets of which are mounted on said frames, gears on the armature-shafts meshing with the axle gear-wheels, and an anti-friction bearing for said casing upon the axle, substantially as described.

3. In a motor for street-cars, the combination, with the axle and a gear-wheel mounted thereon, of a casing covering said wheel and balanced on the axle, an anti-friction bearing for said casing, electric motors mounted on said casing at each side of the axle, and a gear-connection between said motors and the axle gear-wheel, substantially as described.

4. In a motor for street-cars, the combination, with the axle and a gear-wheel mounted thereon, of a casing covering said wheel and balanced upon the axle, an anti-friction bearing for said casing, electric motors mounted on the casing at each side of the axle, a gear-connection between said motors and the axle gear-wheel, pulleys secured to the car superstructure, and a flexible elastic stay attached at its ends, respectively, to the casing on each side of the axle and working over said pulleys, substantially as described.

5. In a motor for street-cars, the combination, with the axle and a gear-wheel mounted thereon, of a casing balanced upon the axle and constituting a support for electric motors operating said wheel, and yielding cushions connecting said casing with the car superstructure and directly opposing the oscillation of said casing upon the axle, substantially as and for the purpose described.

6. In a motor for street-cars, the combination, with the axle and a gear-wheel mounted thereon, of a casing balanced upon the axle and constituting a support for electric motors operating said wheel, and coil-springs attached at their ends, respectively, to said casing and the car superstructure, extending in opposite directions from said casing, substantially as described.

7. In a motor for street-cars, the combination, with the axle and a gear-wheel mounted thereon, of a casing balanced upon the axle and constituting a support for electric motors operating said wheel, anti-friction bearings for said casing, pulley secured to the car-superstructure, an elastic flexible stay attached at its ends respectively to the casing on each side of the axle and working over said pulleys, and springs attached at their ends, respectively, to the casing and the car superstructure, extending in opposite directions from said casing, but in a horizontal plane, substantially as described.

8. In a motor for street-cars, the combination, with the axle and a gear-wheel mounted thereon provided with elongated hubs, of a casing balanced on the axle constituting the support of electric motors for operating said wheel, and anti-friction devices interposed between the bearing-wall of said casing and the hub of said wheel, substantially as described.

9. In a motor for street-cars, the combination, with the axle and a gear-wheel mounted thereon having elongated hubs provided with annular peripheral grooves, of a casing balanced on the axle constituting a support for electric motors operating said wheel, and anti-friction rollers bearing in said grooves and interposed between said hubs and the casing, substantially as described.

10. In a motor for street-cars, the combination, with the axle and a gear-wheel mounted thereon provided with elongated hubs, of a casing constituting a support for electric motors operating said gear-wheel, anti-friction rollers bearing on said hubs, and removable bushings interposed between said rollers and the bearing-wall of the casing, substantially as described.

11. In a motor for street-cars, the combination, with the axle and a gear-wheel mounted thereon provided with elongated peripherally-grooved hubs, of a casing constituting a support for electric motors operating said gear-wheel, anti-friction rollers bearing in said grooves, and removable sectional bushings interposed between said rollers and the bearing-walls of said casing, substantially as described.

This specification signed and witnessed this 2d day of July, 1888.

WILBER S. SALISBURY.

Witnesses:
W. ROSSITER,
FREDK. H. MILLS.